United States Patent [19]

Uitz

[11] 3,995,803
[45] Dec. 7, 1976

[54] FOLDABLE BICYCLE BASKET

[76] Inventor: Mark D. Uitz, 1050 Crest View, Mountain View, Calif. 94040

[22] Filed: Sept. 3, 1974

[21] Appl. No.: 502,852

[52] U.S. Cl. .......................... 224/33 A; 224/45 C
[51] Int. Cl.² ........................................ B62J 7/00
[58] Field of Search ............ 224/32 R, 32 A, 33 R, 224/31, 40, 36, 30.36, 39.41, 41, 45 AA, 45 BA, 45 P, 46 R, 45 C, 42; 248/308

[56] References Cited

UNITED STATES PATENTS

| | | | |
|---|---|---|---|
| 582,229 | 5/1897 | Reynolds | 224/33 A |
| 605,188 | 6/1898 | Rondell | 224/33 R |
| 617,685 | 1/1899 | Gilbert | 224/33 R |
| 657,135 | 9/1900 | Rothaermel | 224/33 A |
| 1,220,975 | 3/1917 | Gemeinder | 224/45 C |
| 2,209,846 | 7/1940 | Pawsat | 224/36 |
| 2,576,111 | 11/1951 | Glenny et al. | 224/36 |
| 2,584,350 | 2/1952 | Holland | 224/45 C |
| 2,646,911 | 7/1953 | Holmberg | 224/45 AA |
| 2,667,995 | 2/1954 | Bruce et al. | 224/45 AA |
| 2,767,894 | 10/1956 | Glenny | 224/36 |

FOREIGN PATENTS OR APPLICATIONS

| | | | |
|---|---|---|---|
| 63,628 | 5/1943 | Denmark | 224/33 A |
| 1,219,972 | 4/1959 | France | 224/45 C |

Primary Examiner—L. J. Paperner
Assistant Examiner—Kenneth Noland
Attorney, Agent, or Firm—Lowhurst & Aine

[57] ABSTRACT

An injection molded plastic foldable bicycle basket includes a front and a rear sidewall hinged to a pair of centrally hinged end walls and closed on the bottom by a hinged bottom wall. The walls are hinged together in such a way that the bottom wall of the basket folds up against the inside of the rear sidewall and the two centrally hinged end walls fold inwardly to collapse the basket into a flat package. A pair of pivotable hooks are provided for hooking the rear wall to the bicycle handlebars and a hinged strut is affixed to the bottom of the rear sidewall for supporting the basket from the headbar of a bicycle. A pair of retractable tote handles are slidably coupled to the front and rear sidewalls for toting of the basket.

4 Claims, 7 Drawing Figures

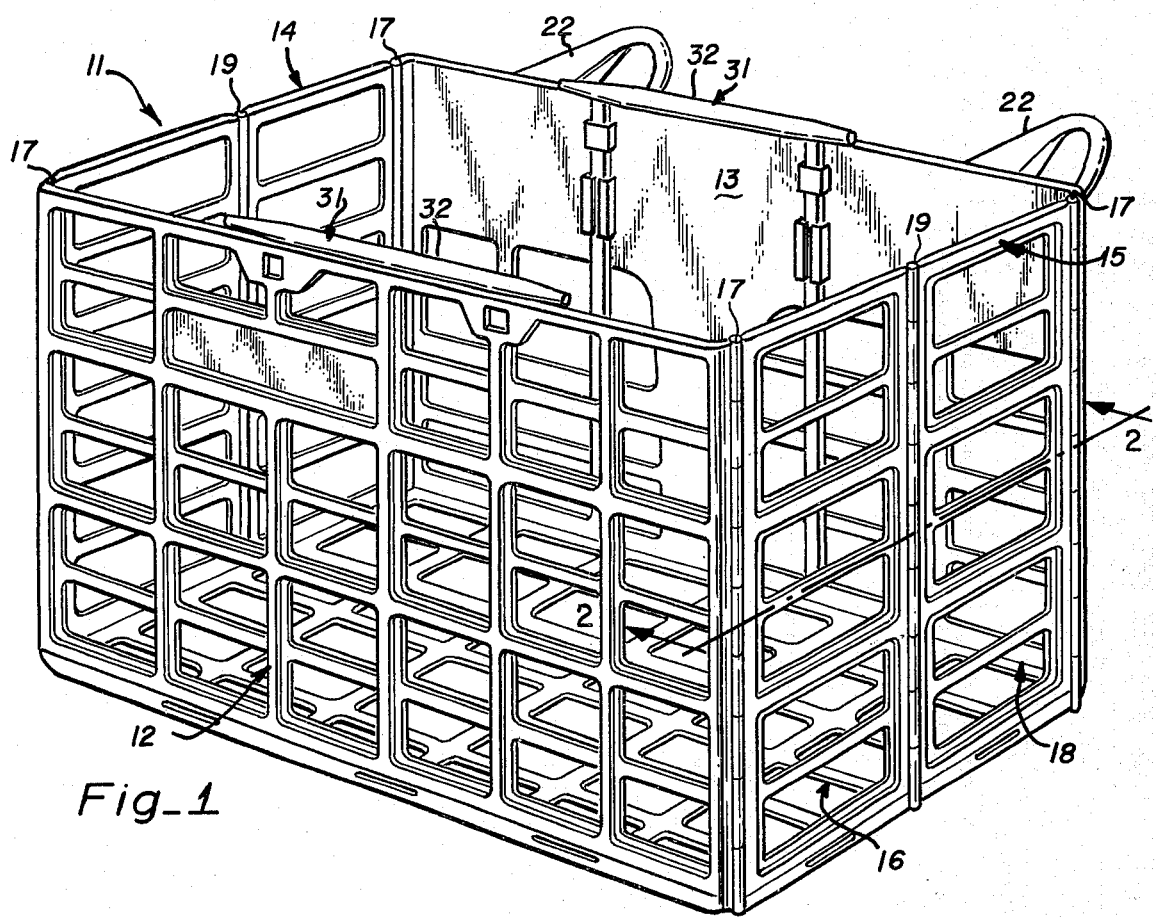
Fig_1
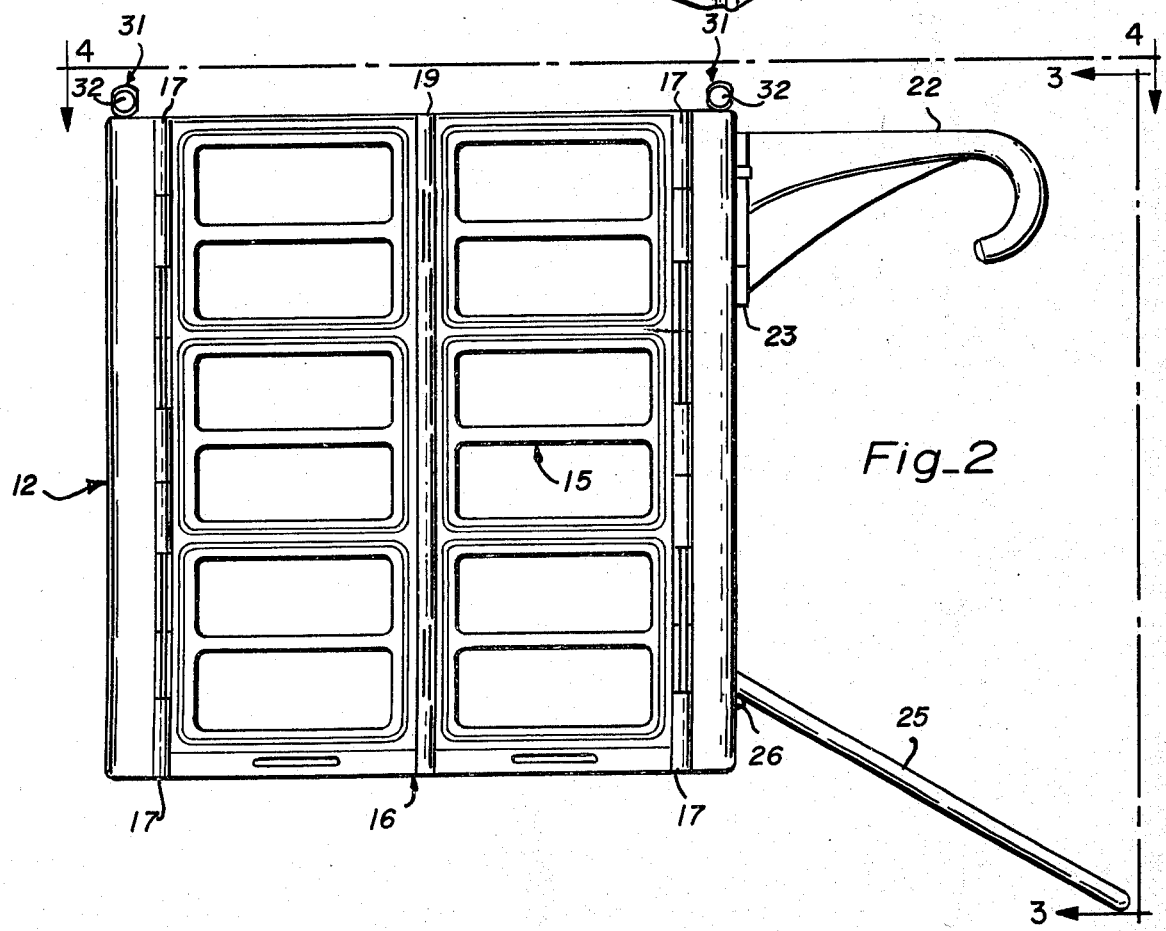
Fig_2

U.S. Patent   Dec. 7, 1976   Sheet 3 of 3   3,995,803
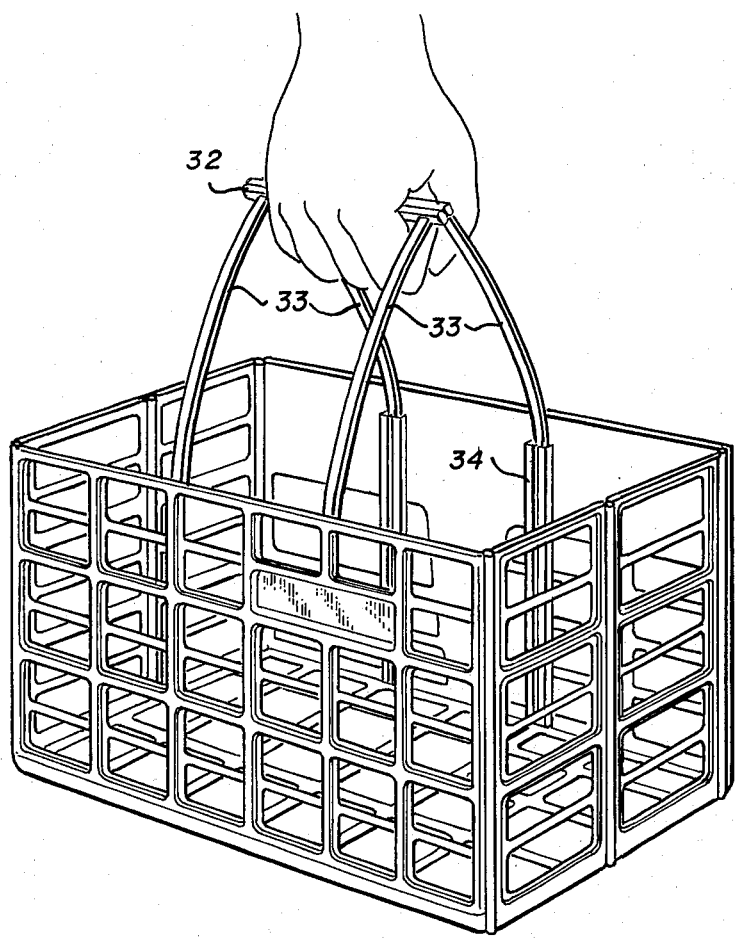
Fig_5
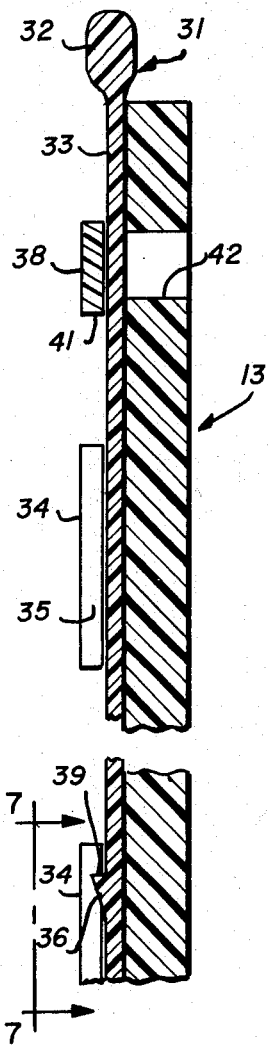
Fig_6
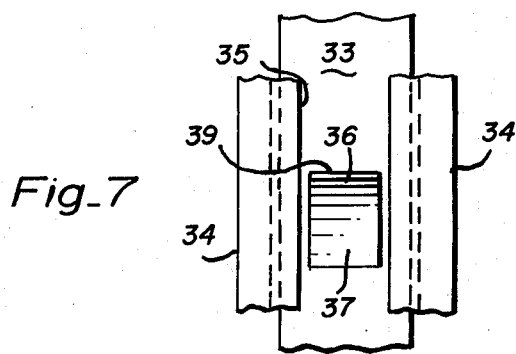
Fig_7

FOLDABLE BICYCLE BASKET

BACKGROUND OF THE INVENTION

The present invention relates in general to foldable bicycle baskets and more particularly to an improved injection molded plastic basket which is completely collapsible into a flat package for stowage and which includes a retractable tote handle.

DESCRIPTION OF THE PRIOR ART

Heretofore, foldable bicycle baskets have been constructed of hinged metal wire frames, such frames being arranged so that the bottom is folded up against the rear sidewall and the two end walls are centrally hinged and fold inwardly to provide a flat collapsed package except for the hooks which hook to the handlebars and a support which connects the basket to the headbar. Samples of such foldable bicycle baskets are found in U.S. Pat. Nos. 582,229 issued May 11, 1897 and 657,135 issued Sept. 4, 1900. While such prior baskets are suitable for their intended purposes it is desired to obtain a foldable bicycle basket which is more easily fabricated of a less expensive material and particularly one which can be fabricated by injected plastic molding methods. In addition, it is desirable to provide some means for easily carrying the basket when detached from the bicycle and arranging the hooks and supports struts in such a manner that they can be collapsed into a flat package for stowage.

SUMMARY OF THE PRESENT INVENTION

The principal object of the present invention is the provision of an improved foldable bicycle basket which may be easily folded into a flat package for stowage and which is readily fabricated by means of plastic injection molding techniques.

In one feature of the present invention, a foldable bicycle basket includes a retractable tote handle means affixed to the basket so that the tote handle means can be retracted for folding and for compact stowage while allowing the basket to be toted when separated from the bicycle.

In another feature of the present invention, a foldable bicycle basket includes pivotable hooks for hooking the basket to the handlebars, whereby the hooks may be pivoted out of their normal position for stowage.

In another feature of the present invention, a foldable bicycle basket includes a hinged support strut for supporting the weight of the basket from the headbar of the bicycle, whereby the support strut may be folded or retracted for compact stowage.

In another feature of the present invention, a foldable bicycle basket is fabricated by injection molding a plurality of hinged frame members and assembling the hinged frame members to form a composite foldable bicycle basket.

Other features and advantages of the present invention will become apparent upon a perusal of the following specifications taken in connection with the accompanying drawings wherein:

DESCRIPTION OF THE DRAWINGS

FIG. 1 is a perspective view of a foldable bicycle basket incorporating features of the present invention, FIG. 2 is an end elevational view of the structure FIG. 1 taken along line 2—2 in the direction of the arrows, FIG. 5 is a view similar to that of FIG. 1 showing the retractable tote handles deployed for use, FIG. 6 is an enlarged foreshortened sectional view of a portion of the structure of FIG. 1 delineated by line 6—6, and FIG. 7 is an enlarged detail view of a portion of the structure FIG. 6 taken along line 7—7 in the direction of the arrows.

DESCRIPTION OF THE PREFERRED EMBODIMENTS

Figure 3:
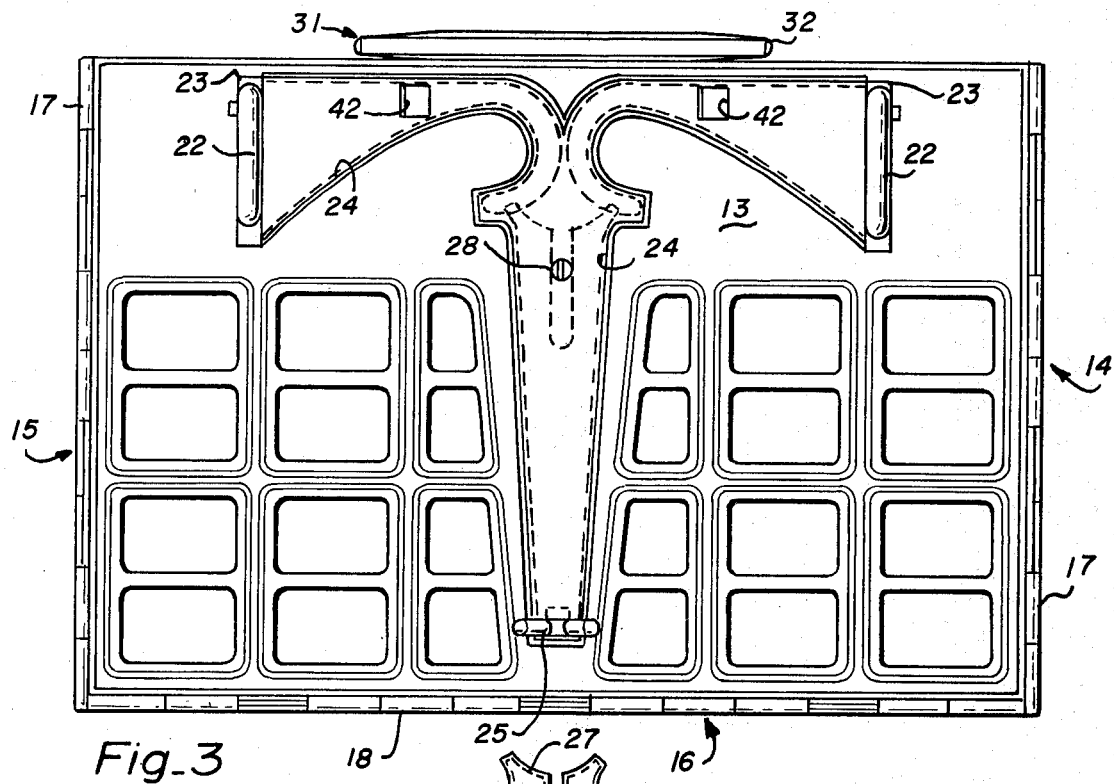
FIG. 3 is an elevational view of the structure FIG. 2 taken along line 3—3 in the direction of the arrows.
Figure 4:
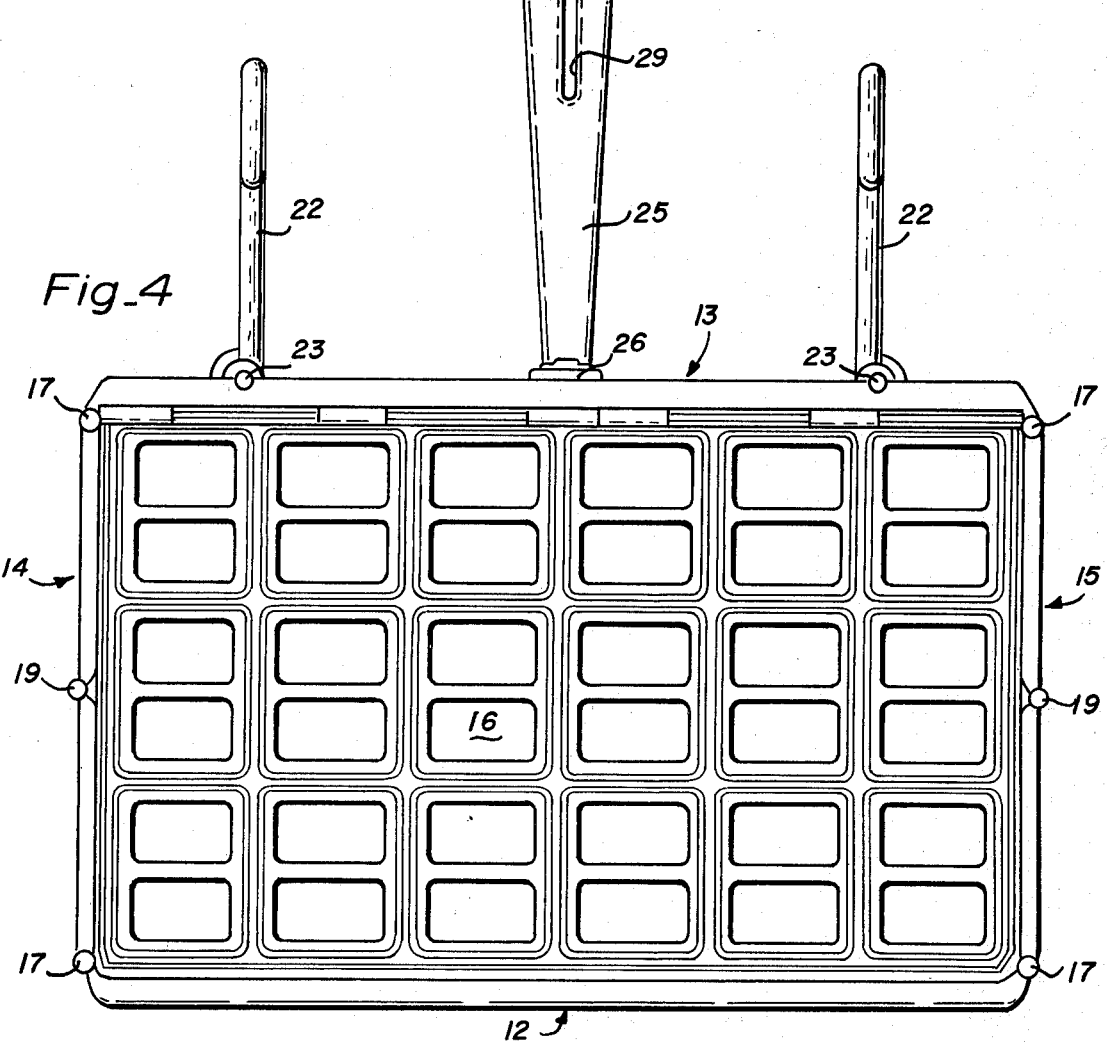
FIG. 4 is a top view of the structure FIG. 2 taken along line 4—4 in the direction of the arrows.

Referring now to FIG. 1-4 there is shown a foldable bicycle basket incorporating features of the present invention. The basket includes a front sidewall 12, a rear sidewall 13, a pair of centrally hinged end walls 14 and 15, and a hinged bottom wall 16. The walls 12–16 are made of injection molded plastic frame grids (as of Lexan plastic) of intersecting web portions with mating piano hinge type hinge portions formed along their adjacent side edges. The side walls 12–16 are hinged together along the mating piano hinge portions 17 and the bottom wall 16 is hinged to the bottom portion of the rear sidewall at 18 so that the bottom wall 18 will pivot up against the inside surface of the rear sidewall 13. The end walls 14 and 15 are centrally hinged by piano hinges 19 to fold inwardly and allow the front sidewall 12 to collapse and fold against the rear wall 13 with the folded end walls 14 and 15 folded therebetween.

A pair of injection molded plastic hooks 22 are pivotably connected to the rear wall 13 via piano hinges 23 for attaching the basket 11 to the bicycle. The hooks 22 are mounted in a recessed portion 24 of the rear wall 13 so that when the hooks 22 are pivoted down against the rear wall 13 they retract into the recessed portion 24 to provide a flat package. In addition, an injection molded support strut 25 is pivotably mounted to the rear wall 13 by a piano hinge 26.

The support strut 25 includes a semi-cylindrical cutout portion 27 at its free end which abuts against the cylindrical outer surface of the headbar of the bicycle for supporting the basket 11 from the bicycle headbar. The strut 25 takes the load of the basket in compression. The strut 25, when not in use, folds into the recessed portion 24 of the rear wall 13 and is locked thereto via a split pin 28 molded into the recessed portion 24 of the rear wall and which is received within a longitudinal slot 29 in the strut 25. The friction lock generated between the split pin 28 and the slot 29 also serves to lock the hooks 22 in their retracted or folded position by being captured in the recess by the free end of the strut 25.

A pair of tote handle assemblies 31 are retractably affixed to the front and rear walls 12 and 13, respectively, of the basket 11 for toting the basket when the basket is removed from the bicycle. The retractable tote handle assemblies 31 include a pair of elongated handle grips 32 to be gripped by the hand of the user. A pair of resilient, bendable, plastic straps 33 depend from the handle portion 32 on from opposite ends of the hand gripped portion of the handle 32. The plastic straps 33 are threaded through retaining guide channels 34 formed as an integral part of the injection molded front and rear sides of the basket 11. The straps 33 are slidably retained within the channel defined by the channel members 34 as backed by the corresponding sidewall 12 or 13.

The channel members 34 are longitudinally slotted at 35 to receive a guide boss 36 formed as in integral part of the respective strap 33 at the lower end thereof. The boss 36 rides within the slot 35 in the retaining channels 34 so as to prevent binding of the strap 33 in the channel 34. In addition, the boss 36 has a tapered wedge shaped leading edge 37 tapering in thickness up to a shoulder 39 to form a catch which catches on an upper channel member 38 which is also formed as an integral portion of the wall 12 or 13 but which is not longitudinally slotted. In this manner, as the strap 33 is withdrawn by pulling up on the handle portion 32, the shoulder portion 39 of the boss 36 catches on the lower lip 41 of the upper guide channel 38 to restrain further outward movement of the strap 33. The strap 33 is initially inserted into the channels 34 and 38, particularly 38, by depressing and bending the boss portion 36 of the strap into a rectangular recess 42 in the wall portion 13 below the upper channel member 38. After the boss portion of the strap 33 has been deflected, the taper 37 allows the boss 36 to pass through the upper retaining channel 38. In this manner the strap 33 is captured in the retractable guide system consisting of guide channels 34 and 38. The straps 33 together with the guides 34 and 38 allow the tote handles assemblies to be fully retracted into the retracted positions as shown in FIGS. 1–4 and to be extended to the carrying position, when desired, as shown in FIG. 5.

The advantages of the foldable bicycle basket 11, as above described, are that the basket is readily fabricated from injection molded plastic parts, as of Lexan plastic. The parts are readily assembled by merely pinning the parts together or snapping the parts together. The basket is completely collapsible for stowage as a package which is relatively thin, as of 1½ inches thick. In addition, the tote handles, which are completely retractable, allow the basket to be conveniently toted when separated from the bicycle.

What is claimed is:

1. In a foldable bicycle basket:
   basket means comprising rigid side and bottom wall portions hinged together for opening for toting objects and for folding and compact stowage;
   means for attaching said basket means to a bicycle;
   tote handle means affixed to said basket means for toting same in the open condition for toting objects in said basket;
   means for retractably affixing said tote handle means to said basket means so that said tote handle means can be retracted for folding and compact stowage of said foldable basket means;
   wherein said side walls include fore and aft side walls interconnected by centrally hinged and foldable mutually opposed end side walls, and wherein said pair of handle means are retractably affixed by said affixing means to said fore and aft side walls; and
   wherein said means for retractably affixing said tote handle means to said pair of fore and aft opposed side walls of said basket means includes, slide receiver means affixed to said opposed fore and aft side walls of said basket to slidably receive a portion of said tote handle means therewithin for retracted compact stowage of said tote handle means.

2. The apparatus of claim 1 wherein said tote handle means includes, flexible carrying strap means affixed to said handle means, and said carrying strap means being that portion of said handle means slidably received within said slide receiver means.

3. Apparatus of claim 2 wherein said slide receiver means includes a pair of laterally spaced generally parallel slide receiver portions affixed to a common side of said basket means, said strap means including a pair of laterally spaced generally parallel strap portions slidably received within said laterally spaced slide receiver portions, and wherein said handle means includes a hand-grip portion to be gripped by the hand of the user, and wherein said pair of strap means are affixed to a common hand grip means at opposite ends of said hand grip portion.

4. In a foldable bicycle basket:
   basket means comprising rigid side and bottom wall portions hinged together for opening for toting objects and for folding and compact stowage;
   means for attaching said basket means to a bicycle;
   tote handle means affixed to said basket means for toting same in the open condition for toting objects in said basket;
   means for retractably affixing said tote handle means to said basket means so that said tote handle means can be retracted for folding and compact stowage of said foldable basket means;
   including hook means horizontally pivotably affixed to said basket means for hooking said basket means to the bicycle and for folding horizontally against a vertical side wall portion of the basket for compact stowage thereagainst; and
   including support strut means vertically pivotably affixed to a vertical side wall of said basket means to be vertically pivoted into engagement with the headbar of the bicycle for taking a load of said basket in compression from the engaged headbar portion of the bicycle and for folding vertically against a vertical side wall portion of the basket for compact stowage thereagainst.

* * * * *